United States Patent [19]

Greene

[11] Patent Number: 5,216,288
[45] Date of Patent: Jun. 1, 1993

[54] WATER LEVEL CONTROL CIRCUIT FOR SUMP PUMPS AND THE LIKE

[75] Inventor: James L. Greene, Kansas City, Mo.

[73] Assignee: The Marley Company, Mission Woods, Kans.

[21] Appl. No.: 792,942

[22] Filed: Nov. 15, 1991

[51] Int. Cl.[5] ............ H01H 35/18; F04B 49/02
[52] U.S. Cl. .................... 307/118; 137/392; 361/178; 340/620; 417/36
[58] Field of Search .......... 307/118, 116; 361/178; 364/509, 510; 417/36; 137/392, 395, 396; 340/620

[56] References Cited

U.S. PATENT DOCUMENTS

| | | | |
|---|---|---|---|
| 3,800,205 | 3/1974 | Zalar | 417/36 |
| 4,244,385 | 1/1981 | Hotine | 417/36 |
| 4,404,809 | 9/1983 | Johnson et al. | 137/392 |
| 4,600,844 | 7/1986 | Atkins | 307/118 |
| 4,742,244 | 5/1988 | Koerner | 307/118 |
| 4,766,329 | 8/1988 | Santiago | 307/118 |
| 4,785,843 | 11/1988 | Nicholson | 137/78.3 |
| 4,952,914 | 8/1990 | Mueller | 340/620 |
| 5,145,323 | 9/1992 | Farr | 417/36 |

Primary Examiner—A. D. Pellinen
Assistant Examiner—Richard T. Elms
Attorney, Agent, or Firm—Kokjer, Kircher, Bowman & Johnson

[57] ABSTRACT

A control circuit for a sump pump or other pump that controls the liquid level in a vessel. The liquid is maintained between upper and lower levels defined by probes in the vessel. The probes are associated with comparators and connect with one comparator input. The upper limit comparator connects with the gate of an SCR which supplies current to the lower limit comparator and also to a relay which controls the on/off condition of the pump. The output of the lower limit comparator controls a switching transistor which is arranged in a series circuit with the SCR and relay coil. Once the SCR is conductive, it is latched in the conductive state until the transistor is made nonconductive by the lower limit comparator. In a sump pump application, latching of the SCR allows the pump to remain activated after the liquid level is reduced below the upper probe.

6 Claims, 1 Drawing Sheet

WATER LEVEL CONTROL CIRCUIT FOR SUMP PUMPS AND THE LIKE

FIELD OF THE INVENTION

This invention relates generally to the control of the liquid level in a vessel and more particularly to an improved circuit for controlling a pump in a manner to maintain the liquid in a sump or other vessel between upper and lower limits.

BACKGROUND OF THE INVENTION

Sump pumps have long been used to keep water in a sump from rising high enough to cause flooding or other problems. Typically, the pump comes on when the water level rises to a preset upper limit, and the pump then pumps water out of the sump to reduce the liquid level. It is usually undesirable to pump the sump completely dry because the pump can be damaged if it operates under dry pumping conditions. Consequently, a low limit is normally established, and the pump is controlled such that it shuts off when the liquid level is decreased to the low limit.

It is common practice to make use of a float switch to control the on/off condition of the pump. When the water level rises to the upper limit, the float rises with it and acts at the upper limit to activate the pump. When the water level is reduced by operation of the pump, the float is lowered with the water and acts at the lower limit to deactivate the pump. The disparity in the level between the high and low limit positions prevents the pump from unduly cycling on and off and possibly overheating or otherwise becoming damaged.

Although float switches of various types have been used and many have performed satisfactorily, float switches have the disadvantage of requiring considerable space in the sump. Often, the float switch is carried on the end of an arm that extends generally laterally from the pump, and this arrangement requires the sump to be relatively large. Consequently, there are problems with float switches when the sump is restricted in size. Additionally, float switches rely on moving mechanical parts for proper operation, and the parts can become worn or adversely affected by the moisture that is invariably present in their operating environment.

Electrical control systems have been proposed for controlling the on/off condition of the pump, as exemplified by U.S. Pat. No. 4,600,844 to Atkins. The electrical circuit shown therein makes use of an OR gate and relies on its output being fed back to a comparator to maintain the pump energized while the water level is being pumped down toward the low limit. The reliability of the circuit is dependent on the electrical conductivity of the liquid in the sump, which can vary considerably. If the water exhibits a high electrical resistance or if there is poor electrical contact between the deeper probe and the water (due to a buildup of deposits on the probe or for any other reason), the lower limit comparator may have a high enough potential at its inverting input that the comparator doe not keep the OR gate active. Under these conditions, the pump cycles on and off under the control of only the shallower probe. Under other conditions, the pump can cycle on and off under the control of only the deeper probe. In either case, the excessive pump cycling that results can damage the pump or other parts of the system.

SUMMARY OF THE INVENTION

The present invention is directed to an improved control circuit, particularly for sump pumps, which makes use of probes that require much less room than float switches and which operates more reliably than the systems that have been proposed in the past.

In accordance with the invention, upper and lower probes are arranged at different elevations in a sump or other vessel containing liquid. The probes are connected to one input of respective upper and lower limit comparators. The upper limit comparator receives a consistent fixed reference voltage on its other input and has its output terminal connected with the gate of a silicon controlled rectifier (SCR). The SCR is included in a circuit which includes a relay coil arranged to actuate the pump when energized. The circuit also includes a switching transistor having its base connected with the output of the lower limit comparator. The second input to the lower limit comparator is a reference voltage that is consistent but present only when the SCR is conductive.

Through this circuit arrangement, the upper limit comparator output is normally in a low state and applies a high signal to the SCR gate only when the water level rises sufficiently to contact the upper probe. Then, the SCR becomes conductive and a reference voltage is applied to the lower limit comparator in order to change its low output state to a high state and thereby place the switching transistor in a conductive condition. This energizes the relay and turns the pump on.

After the water level has been reduced below the upper probe and the SCR gate reverts to a low state, the SCR nevertheless remains conductive because current through it continues. Only when the water level is reduced below the lower probe does the SCR become nonconductive, because the output of the lower limit comparator then reverts to a low state to make the transistor nonconductive, thus interrupting current flow through the SCR and deenergizing the relay coil and the pump. The SCR becomes conductive again only when the water level rises above the upper probe, and the pump is at that time energized again by the control circuitry.

The circuit of the present invention is reliable and effective in energizing the pump whenever the liquid level reaches the upper probe and deenergizing the pump when the level is reduced to the lower probe. Advantage is taken of the self-latching characteristic of the SCR to keep the pump in operation as the liquid level is being pumped down to the lower probe level. At the same time, the circuit prevents the pump from being cycled on and off by only one of the probes, and the problems of undue cycling are avoided.

The pump control circuit is particularly effective in controlling sump pumps but is also useful in other applications that involve maintaining the liquid level between limits in water tanks and other vessels containing liquids. In addition, the circuit can be used in an application involving pumping water into a vessel when it is depleted to a low level and to interrupt the addition of water to the vessel when the level has been raised to a predetermined high level. It is a particular feature of the invention that the only change required for this reverse operating mode is the substitution of normally closed relay contacts for the normally open relay contacts that are used in the control of a sump pump or other pump that removes liquid from the vessel.

Another important feature of the invention is the ability of the control circuit to be operated directly from a conventional source of alternating current power or from other types of power supplies, including particularly the power supply disclosed in U.S. Pat. No. 5,015,152 to Greene.

DESCRIPTION OF THE DRAWING

In the accompanying drawing.

DETAILED DESCRIPTION OF THE INVENTION

Figure 1:
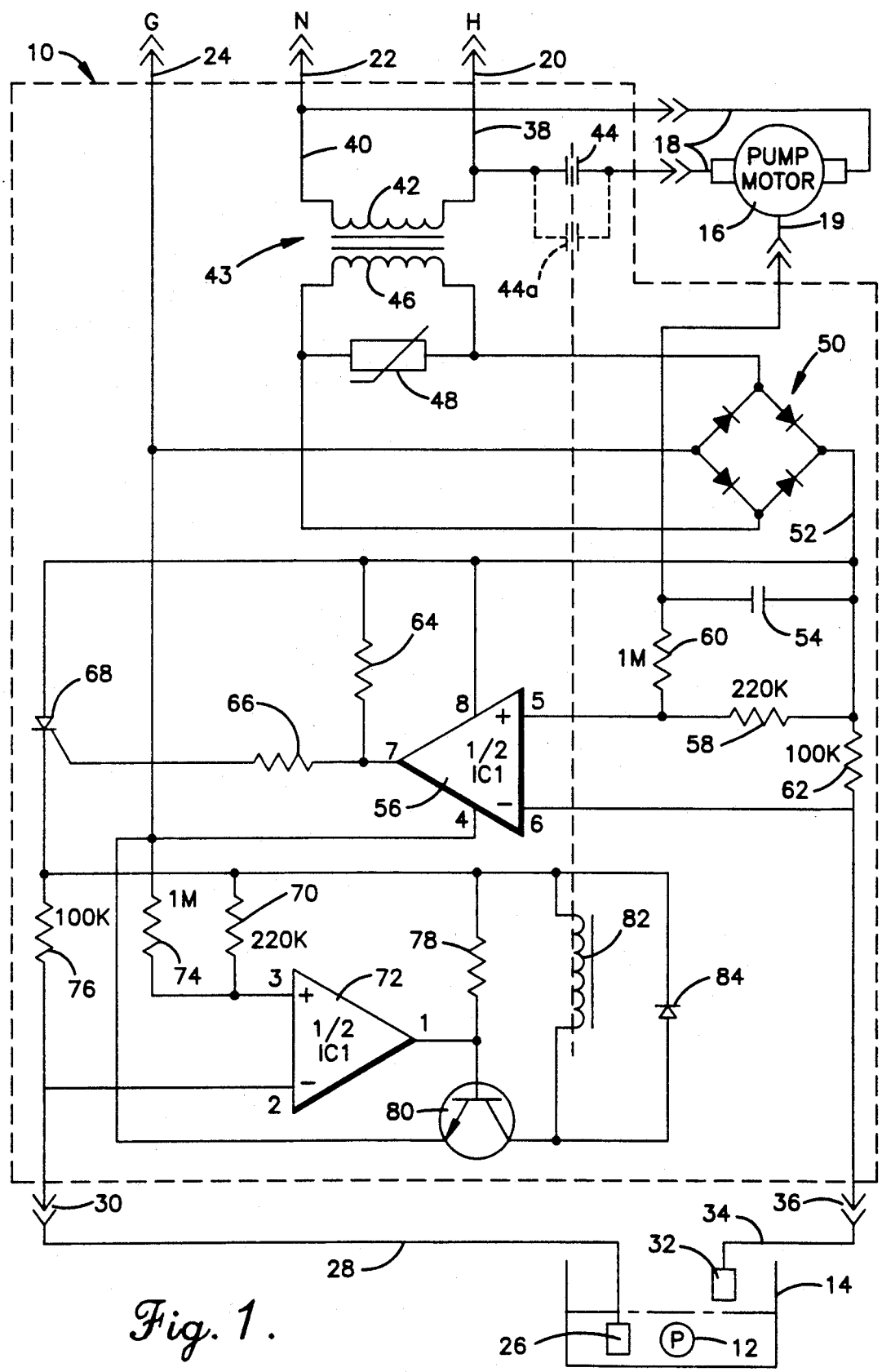
FIG. 1 is a schematic diagram of a control circuit constructed in accordance with a preferred embodiment of the present invention for use in controlling the on/off cycling of a sump pump, with an alternative set of normally closed relay contacts depicted in broken lines.

Referring now to the drawing in more detail, numeral 10 generally designates an enclosure box which contains a control circuit that is used to control the operation of a sump pump 12 mounted in a sump 14. The pump 12 includes an electric motor 16 having lead wires 18 and a ground lead wire 19 which plug into the control box 10, preferably on its front face. The back of the control box 10 includes a pair of prongs 20 and 22 which may be inserted into a conventional electrical outlet to connect the respective prongs 20 and 22 with the "hot" and neutral conductors of an alternating current power system. A third prong 24 connects with the ground wire of the power system as well as the pump motor ground lead wire 19 when the pump is interfaced to the enclosure 10.

A low probe 26 connects with a elongated wire 28 having a plug in connection at 30 on the bottom of the control box 10. An upper probe 32 likewise connects with a wire 34 which may be connected at 36 on the bottom of the box 10. The probes 26 and 32 are disposed in the sump 14 with the low probe 26 located deeper in the sump or at a lower elevation than the shallower upper probe 32. The levels at which the probes 26 and 32 are located may be adjusted as desired.

The control circuitry within the box 10 includes hot and neutral conductors 38 and 40 which connect with the respective prongs 20 and 22 and which energize the primary coil 42 of a transformer 43 with 120 volts AC. The conductors 38 and 40 connect with opposite sides of the pump motor 16 through a set of normally open relay contacts 44. Consequently, whenever the contacts 44 are closed, the pump motor 16 is energized with 120 volt alternating current to activate the sump pump 12 and thereby pump liquid out of the sump 14 in a conventional manner.

The secondary coil 46 of the transformer 43 has a metal oxide varistor 48 connected across it to suppress surge voltages and transients. The secondary coil 46 produces alternating current at 12 volts which is applied to a diode bridge rectifier generally identified by numeral 50. The rectifier 50 converts the 12 volt alternating current to direct current. One output of the rectifier 50 is connected with the ground wire of the pump 16 and with prong 24. A conductor 52 connects with the positive output side of the rectifier and is thus supplied with a positive 12 volt potential. A filter capacitor 54 is connected across the rectifier outputs to smooth out the direct current that is supplied to the logic circuitry.

An upper limit comparator 56 has its non-inverting input connected with line 52 through a resistor 58. The non-inverting input of comparator 56 is connected with ground through another resistor 60 which, along with resistor 58, provides a voltage divider network supplying a fixed reference voltage to the non-inverting input of comparator 56. The inverting input of comparator 56 connects with line 52 through another resistor 62. The upper probe 32 also connects with the inverting input of comparator 56 through conductor 34 and the connection 36. When the grounded water level in the sump 14 makes contact with the upper probe 32, the inverting input of comparator 56 is essentially ground. The combined resistances of 32, 34, 36 and that of the water would need to exceed several hundreds of thousands of ohms before the inverting input of comparator 56 would equate to the non-inverting input reference voltage where reliability problems could occur.

When the upper probe 32 is above the level of the liquid in the sump 14, it effectively presents an infinite resistance. Under these conditions, the inverting input of comparator 56 is held at a higher potential than the non-inverting input due to no presence of ground at the shallow probe 32, allowing the supply voltage to be present at the inverting input compared to the noninverting input of comparator 56 where resistance of resistors 60 and 58 create a voltage divider thus reducing the voltage at the noninverting input of comparator 56.

The output of comparator 56 is connected with line 52 through a resistor 64. A silicon controlled rectifier (SCR) 68 has its gate connected with the output of comparator 56 through another resistor 66. The anode of the SCR 68 connects with line 52, and the cathode side of the SCR connects through a resistor 70 with the non-inverting input of a lower limit comparator 72. The non-inverting input of comparator 72 is connected with ground through another resistor 74 such that the resistors 70 and 74 provide a voltage divider which supplies a reference voltage to the non-inverting input of comparator 72 when the SCR is conductive.

The cathode side of the SCR 68 connects through another resistor 76 with the inverting input of comparator 72. The combined resistances of that of the water with conductor 28, 30 and 26 with resistor 76 creates a voltage divider at the inverting input of comparator 72 only when probe 26 is grounded through the water. This voltage is compared to the voltage at the noninverting input of comparator 72 which is a reference voltage generated by the combined resistances of resistors 70 and 74 only when the SCR 68 is conductive. The inverting input of comparator 72 connects with the lower probe 26 through conductor 28 and the connection 30.

The output of the comparator 72 is connected between a resistor 78 and the base of a switching transistor 80. The cathode of the SCR 68 connects with the other side of resistor 78. Transistor 80 forms part of a control circuit that includes the SCR 68, a relay coil 82 which controls the relay contacts 44, the comparator 72 and the switching transistor 80. When the SCR 68 and the transistor 80 are both conductive, the control circuit is completed through the relay coil 82, and the relay is then energized to close its contacts 44 and energize the pump motor 16. A diode 84 is connected in parallel with the relay coil 82 to protect the transistor 80 from inductive out rush currents when the coil is deenergized.

In operation of the control circuit, both of the probes 26 and 32 exhibit what is essentially infinite resistance when the liquid level in the sump is below the lower probe 26. Under these conditions, the non-inverting input of comparator 56 is at a lower potential than the inverting input, and the comparator 56 is in a low output state and pulls the direct current to ground through resistor 64. A low signal is then applied to the gate of the SCR 68 and the SCR is non-conductive. Consequently, the control circuit through relay coil 82 is interrupted and the relay coil remains deenergized such that contacts 44 remain open and the pump motor 16 remains deenergized.

When the liquid level in the pump rises high enough to contact the lower probe 26, the upper probe 32 still remains above the liquid level and the SCR 68 remains non-conductive to maintain the pump motor 16 in a deenergized state.

Once the liquid in the sump rises high enough to contact the upper probe 32, the upper probe is grounded through the liquid in the sump, and the inverting input of comparator 56 is then pulled to ground. The positive reference voltage that is applied to the non-inverting input of comparator 56 is then greater than the voltage at the inverting input, and the comparator output is placed in a high state. The high output signal from the comparator results in application of a high signal through resistors 64 and 66 to the gate of the SCR 68, and the SCR is placed in a conductive state. Because the low probe 26 is grounded through the liquid in the sump, the inverting input of the low limit comparator 72 is at ground potential. The SCR provides a positive voltage through resistor 70 to the non-inverting input of comparator 72 such that the non-inverting input is at a higher level than the inverting input, and the output of comparator 72 is then in a high state. A high signal is then applied through resistor 78 to the base of the switching transistor 80 to place the transistor in a conductive state. The control circuit through relay coil 82 is then completed to energize the relay coil, closing contacts 44 and energizing the pump motor 16.

As the pump 12 operates to pump liquid out of the sump, the liquid level shortly drops below the level of the upper probe 32. At that time, the inverting input of comparator 56 is at a higher voltage than the non-inverting input, so the output of comparator 56 reverts to a low state. However, the SCR remains "latched" in a conductive state so long as current continues to pass through it. As a result, coil 82 remains energized and the pump continues to operate.

When the pump has reduced the liquid level below the lower probe 26, the inverting input of the low limit comparator 72 is again at a greater voltage than the non-inverting input. The output of comparator 72 goes to a low state to remove the high signal on the base of transistor 80. The transistor then becomes non-conductive to interrupt the control circuit and the flow of current through the SCR 68 and the relay coil 82. The contacts 44 then open to deenergize the pump motor 16. The SCR 68 remains non-conductive until its gate is once again placed in a high state, which occurs only when the liquid level rises high enough to contact the upper probe 32.

In this manner, the sump pump 12 is cycled on and off to prevent the liquid level in the sump from rising above the upper probe 32. When the liquid level has been lowered below the lower probe 26, the pump is deenergized to prevent it from pumping under dry conditions and possibly being subjected to overheating o other damage. The circuit takes advantage of the self-latching characteristics of the SCR 68 to keep the pump operating when the level has been reduced below the upper probe 32. The circuit arrangement also prevents the pump from being controlled solely by either of the probes and thus possibly cycling excessively and causing overheating and other problems.

The control circuit of the present invention is useful in sump pump applications and in other applications involving the removal of liquid from vessels of various types. In addition, the control circuit can be used in an application that involves pumping liquid into a vessel, and conversion to this operating mode can be carried out simply by replacing the normally open relay contacts 44 with normally closed relay contacts such as those illustrated in broken lines in the drawing and identified by numeral 44a.

When the contacts 44a are used in place of contacts 44, the pump is deenergized when the liquid level is high enough to contact the upper probe 32. The voltage at the inverting input of comparator 56 is then less than that at the non-inverting input, and a high signal applied from the output of comparator 56 to the gate of the SCR 68 places the SCR in a conductive state. The lower probe 26 is also immersed in the liquid, and the non-inverting input of comparator 72 is at a higher voltage than the inverting input so that the output of comparator 72 is high, placing the transistor 80 in a conductive state. The control circuit is then completed through the relay coil 82, and the coil is energized to cause the normally closed contacts 44a to open and deenergize the pump.

When the liquid level falls below the upper probe 32, the output of comparator 56 reverts to a low state, but the SCR 68 remains latched in the conductive state so long as current continues to flow through it. The pump remains deenergized because coil 82 remains energized to maintain contacts 44a open.

When the liquid level has dropped below the lower probe 26, the low limit comparator 72 provides a low output signal, and transistor 80 then becomes non-conductive to interrupt the current flow through the SCR 68 and the relay coil 82. Relay contacts 44a revert to the normally close state and energize the pump motor 16 to pump liquid into the vessel which contains the probes 26 and 32. As the liquid level rises above probe 26, the SCR 68 remains non-conductive and coil 82 remains in the deenergized state so that the pump keeps operating. Only when the liquid level is increased to the level of the upper probe 32 is the pump deenergized in the manner indicated previously.

Thus, the control circuit is effective in an application that requires liquid to be pumped into a vessel in order to maintain the level between prescribed upper and lower limits. The lower probe 26 prevents the vessel from being depleted to an undesirably low level, while the upper probe 32 prevents the pump from supplying an excessive amount of liquid and thus possibly overflowing the vessel or causing other problems.

Rather than being operated directly from available AC power as depicted in FIG. 1, the circuit of the present invention can be interfaced with other types of power supplies and can be interfaced with the battery monitoring and charging circuit disclosed in U.S. Pat. No. 5,015,152 to Greene. In Order to achieve such an interface, the float switch of the patented circuit is eliminated, and the conductors leading to it are connected across the relay contacts 44 of the circuit shown herein. The transformer 43, varistor 48, rectifier 50, capacitor 54 and related circuitry are not necessary, as can be appreciated by those skilled in the art. The pump motor 16 is replaced by the pump motor and connections therefore shown in the patented circuit. Those skilled in the art will also appreciate that measures can be taken to prevent reverse current flow in the event that the power leads are connected to the power source with incorrect polarity. For example, a Schotcky diode can be used to protect the logic circuitry from reverse current flow.

From the foregoing, it will be seen that this invention is one well adapted to attain all the ends and objects hereinabove set forth together with other advantages which are obvious and which are inherent to the structure.

It will be understood that certain features and subcombinations are of utility and ma be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for controlling the liquid level in a vessel, comprising:
    pumping means for pumping liquid from the vessel when the pumping means is energized;
    an upper probe in the vessel at a level to be contacted by the liquid therein when the liquid rises to an upper level;
    a lower probe in the vessel at a level to be contacted by the liquid therein whenever the liquid is above a lower level which is below said upper level;
    an upper limit comparator having a first input receiving a reference voltage and a second input connected with said upper probe, said upper limit comparator having an output which changes from a first state to a second state in response to changes in the voltage differential between said first and second inputs when the upper probe is contacted by the liquid;
    a control circuit for the pumping means operable to energize the pumping means when electric current passes through said circuit and to deenergize the pumping means when current flow through said circuit is interrupted;
    an SCR in said control circuit having a gate terminal connected to the output of said upper level comparator, said SCR being placed in a conductive state in said second state of the upper limit comparator output and remaining in the conductive state after the upper limit comparator output reverts to the first state so long as electric current continues to flow through said control circuit;
    a lower limit comparator having a first input receiving a reference voltage when said SC is conductive and a second input connected with said lower probe, said lower limit having an output which assumes first and second states in response to change in the voltage differential between the first and second inputs thereto and which assumes the second state only when the SCR is conductive and said lower probe is contemporaneously contacted by the liquid; and
    an electronic switch in said control circuit responsive to said output of the lower limit comparator to effect completion of said control circuit in the second state of the lower limit comparator output and interruption of said control circuit in the first state of the lower limit comparator output.

2. The apparatus of claim 1, wherein said electronic switch comprises a transistor having conductive and nonconductive conditions in which the control circuit is respectively completed and interrupted, said transistor having a base terminal connected with the output of said lower level comparator.

3. Apparatus for controlling a sump pump operating in a sump in which upper and lower probes are disposed at respective high and low liquid level limits, said apparatus comprising:
    an upper limit comparator having a first input receiving a reference voltage and a second input connected with said upper probe, said upper limit comparator having an output which responds to the voltage differential between said first and second inputs and which changes from a first state to a second state when the liquid in the sump rises sufficiently to contact said upper probe at the high level liquid;
    a control circuit having a completed condition in which the sump pump is energized and an interrupted condition in which the sump pump is deenergized;
    an SCR in said control circuit having conductive and nonconductive states and a gate terminal connected with said output of the upper limit comparator to effect the conductive state of the SCR when the upper limit comparator output is in the second state, said SCR remaining conductive so long as current passes therethrough and reverting to the nonconductive state when the upper limit comparator output is in the first state and the current through the SCR is interrupted;
    a lower limit comparator having a first input receiving a reference voltage when said SCR is conductive and a second input connected with said lower probe, said lower limit comparator having an output which responds to the voltage differential between the inputs thereto and which is normally in a first state and in a second state only when the SCR is conductive and the lower probe is contemporaneously contacted by liquid in the sump; and
    means responsive to said lower limit comparator output to complete said control circuit in the second state of the lower limit comparator output and to interrupt the control circuit in the first state of the lower limit comparator output.

4. Apparatus as set forth in claim 3, wherein the means responsive to said lower level comparator output comprises a transistor having conductive and nonconductive conditions in which the control circuit is respectively completed and interrupted, said transistor having a base terminal connected with the output of said lower level comparator.

5. Apparatus for controlling the liquid level in a vessel, comprising:
    pumping means having an energized condition for pumping liquid into said vessel;
    an upper probe in the vessel at a level to be contacted by the liquid therein when the liquid rises to an upper level;
    a lower probe in the vessel at a level to be contacted by the liquid therein whenever the liquid is above a lower level which is below said upper level;

an upper limit comparator having a first input receiving a reference voltage and a second input connected with said upper probe, said upper limit comparator having an output which changes from a first state to a second state in response to changes in the voltage differential between said first and second inputs when the upper probe is contacted by the liquid;

a control circuit for said pumping means operable to deenergize the pumping means when electric current passes through the control circuit and to energize the pumping means upon interruption of current flow through the control circuit;

an SCR in said control circuit having a gate terminal connected to the output of said upper level comparator, said SCR being placed in a conductive state in said second state of the upper limit comparator output and remaining in the conductive state after the upper limit comparator output reverts to the first state so long as electric current continues to flow through said control circuit;

a lower limit comparator having a first input receiving a reference voltage when said SCR is conductive and a second input connected with said lower probe, said lower limit having an output which assumes first and second states in response to change in the voltage differential between the first and second inputs thereto and which assumes the second state only when the SC is conductive and said lower probe is contemporaneously contacted by the liquid; and an electronic switch in said control circuit responsive to said output of the lower limit comparator to effect completion of said control circuit in the second state of the lower limit comparator output and interruption of said control circuit in the first state of the lower limit comparator output.

6. Apparatus as set forth in claim 5, wherein said electronic switch comprises a transistor having conductive and nonconductive conditions in which the control circuit is respectively completed and interrupted, said transistor having a base terminal connected with the output of said lower level comparator.

* * * * *